(12) United States Patent
Davis

(10) Patent No.: US 10,712,948 B1
(45) Date of Patent: Jul. 14, 2020

(54) PREDICTIVE STORAGE EXPANSION

(71) Applicant: Pure Storage, Inc., Mountain View, CA (US)

(72) Inventor: John D. Davis, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 516 days.

(21) Appl. No.: 15/338,057

(22) Filed: Oct. 28, 2016

(51) Int. Cl.
*G06F 3/00* (2006.01)
*G06F 3/06* (2006.01)

(52) U.S. Cl.
CPC .......... *G06F 3/0611* (2013.01); *G06F 3/0631* (2013.01); *G06F 3/0685* (2013.01)

(58) Field of Classification Search
None
See application file for complete search history.

(56) References Cited

U.S. PATENT DOCUMENTS

| | | | | |
|---|---|---|---|---|
| 7,117,259 B1* | 10/2006 | Rohwer | .............. | H04L 65/4069 709/223 |
| 2007/0133311 A1* | 6/2007 | Kim | .................... | G06F 13/4243 365/189.02 |

* cited by examiner

*Primary Examiner* — Midys Rojas
(74) *Attorney, Agent, or Firm* — Womble Bond Dickinson (US) LLP

(57) ABSTRACT

A method for mapping storage system resources is provided. The method includes receiving identification information from a plurality of storage system resources of at least one data center, and receiving performance information from the plurality of storage system resources. The method includes generating a physical or virtual mapping, in one or more dimensions, of locations of each of the plurality of storage system resources, relative to the at least one data center, and representing the identification information and the performance information in the physical or virtual mapping of each of the plurality of storage system resources.

20 Claims, 7 Drawing Sheets

PREDICTIVE STORAGE EXPANSION

BACKGROUND

In a storage system, how an enterprise wants to scale storage may impact available failure domains and/or how much the expansion costs. Ad hoc decisions based on guesswork and piecemeal information, individual preferences, undocumented equipment, incomplete historic view of how a particular storage system has evolved over time and incomplete or ill-defined "big picture" view can result in unwise or regrettable expenditures. In addition, problems inevitably arise after the fact of an expansion of the storage system where these ad hoc decisions are used. Manual inventorying of equipment is a step in the right direction in preparation for an expansion, but can be time-consuming and error-prone, and still may not present sufficient information for consideration by decision-makers. It is within this context that the embodiments arise.

SUMMARY

In some embodiments a method for mapping storage system resources, performed by a mapping system having a processor, is provided. The method includes receiving identification information from a plurality of storage system resources of at least one data center, and receiving performance information from the plurality of storage system resources. The method includes generating a physical or virtual mapping, in one or more dimensions, of locations of each of the plurality of storage system resources, relative to the at least one data center, and representing the identification information and the performance information in the physical mapping of each of the plurality of storage system resources.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A mapping system is described below. The mapping system gathers information about storage system resources, e.g., for an enterprise with one or more data centers, and presents the information in a physical or virtual mapping that is useful for decision-making about expansion of a storage system. Storage capacity trends help define how much future capacity a system might need. Storage system inventory, combined with inferred physical proximity using communication latency (e.g., via ping or other mechanisms) can be used to determine if storage components share a chassis, a rack, a cage, a data center, or are geographically near or far. If trace route is used, the number of network hops can be added to supplement the latency measurement to define the component-to-component distance. Powerline communication or characterization can be applied to understand which systems are in the same power domain. Historical performance data can help to determine a minimum bar of performance required for some buckets (e.g., volumes, directories, objects, etc.) of storage. The combination of latency, distance, performance, failure domains and cost can be influential in determining how to expand a storage system. In some embodiments, policies could drive compute and network expansion decisions along with placement of the equipment or components. In some embodiments, the system could allow for automatic procurement with pre-provisioned components (built and configured (including volumes and sizes of volumes) shipped to the customer within a specified window of time, for just-in-time deployment at the desired location. Policies can be analyzed to define priority on failure domains (e.g., adding more chassis in different racks and/or different power phases or domains). Likewise, cost can be a factor for optimization, e.g., enabling single blades to be added to a storage array versus a minimum number of blades in a new chassis. These recommendations, in which information that the mapping system requests, gathers, analyzes, formats and presents in a physical mapping plays an important and objective role, can then be used for purchasing and storage deployment strategies.

Figure 1:
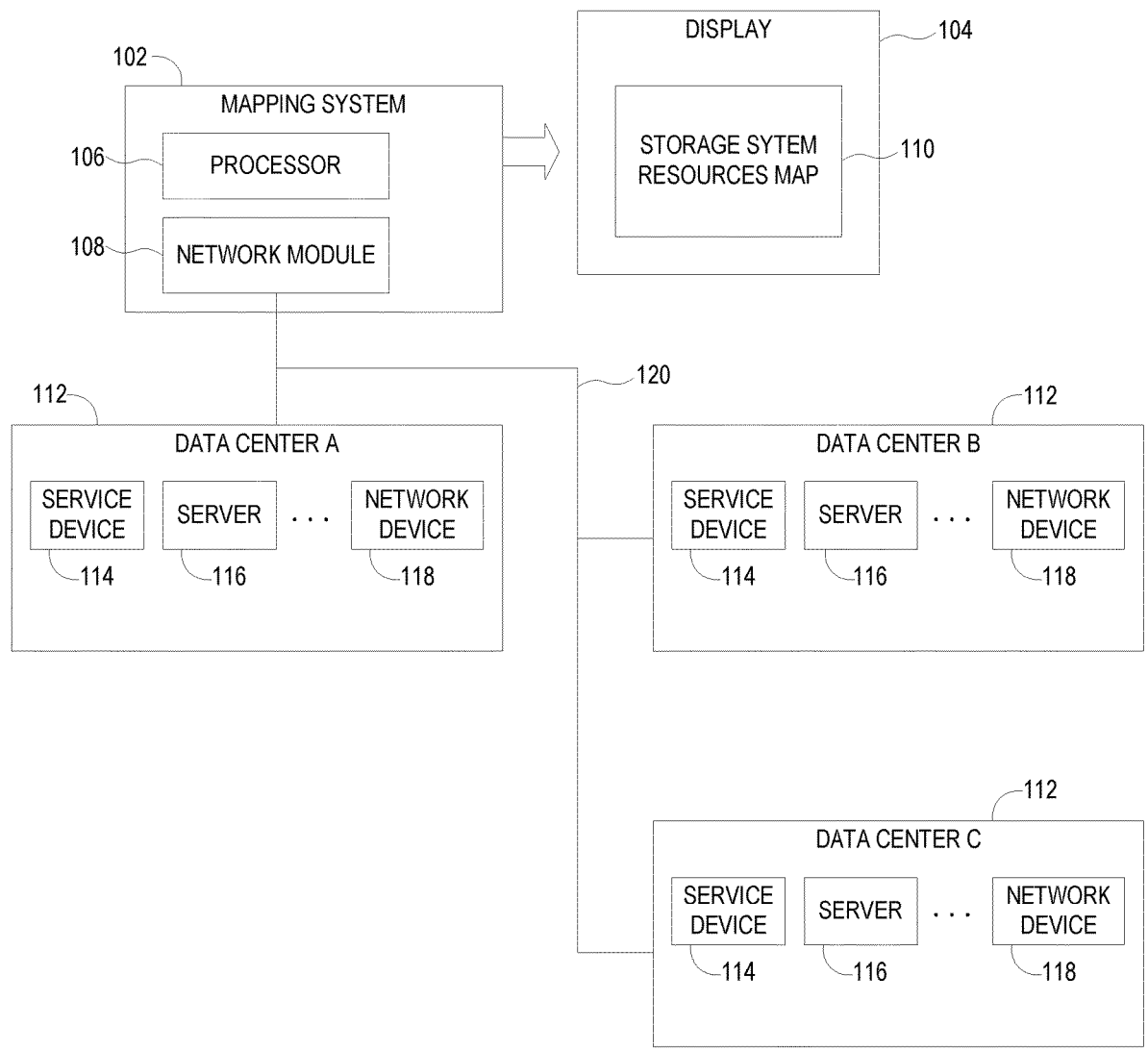
FIG. 1 is a system diagram of a mapping system communicating with storage system resources in data centers and producing a storage system resources map in accordance with some embodiments.

FIG. 1 is a system diagram of a mapping system 102 communicating with storage system resources in data centers 112 and producing a storage system resources map 110. The data centers 112 are shown with various storage system resources such as storage devices 114, servers 116, network devices 118, etc. Communication between the mapping system 102 and the data centers 112 and various storage system resources is through a network module 108 of the mapping system 102, connected to a network 120 to which the data centers 112 and storage system resources are also connected. The mapping system 102 could be external to, or internal to a data center 112. In operation, the mapping system 102 requests and collects various types of information from the storage system resources, such as identification information and performance information, generates a storage system resources map 110 using this information, and can present the storage system resources map 110 for example on a display 104 using a graphical user interface, or in printed form. Various formats for the storage system resources map 110 are readily devised, such as a two-dimensional or three-dimensional graphical format, a database format, a list, etc. Some of these could have links or levels to explore, or viewing angles, or could generate reports on request.

In various embodiments, the mapping system 102 can gather and represent various types of information on a physical mapping, e.g., the storage system resources map 110. For example, the mapping system 102 could request and gather measured host to array latency, such as how many hops there are between host and array, and what kinds of systems and connections there are in terms of routers and other network equipment. The system can use discovery protocols to determine component connections (what is connected to what) and what is the transit time, to build or generate a view, creating two-dimensional or three-dimensional models. The models illustrate where, in one or more data centers, various pieces of equipment are located. In some embodiments, a two-dimensional grid could be overlaid on a floor, and connection points from equipment in racks used to indicate physical locations of equipment relative to the two-dimensional grid. Multiple floors of buildings could be represented, as could multiple buildings, in the storage system resources map 110. It should be appreciated that the embodiments may represent various types of information on a virtual mapping also. For example, dimensional views (latency, bandwidth, etc.) coupled with time of day, may present different views of resources that are not seen in the physical view or mapping. The embodiments enable the virtual visualization to be decoupled from the physical location, if a user desires that. It should be appreciated that the embodiments are not limited to physical mappings as virtual mappings may be integrated into the embodiments. In addition, the embodiments are not limited to particular dimensions as other dimensions, such as time, may be integrated into the embodiments. For example, other dimensions like latency, bandwidth, etc., are virtual mappings that could be used to display the data, and time is another variable that shows different patterns or use of a database to search for anomalies, etc. In addition, user defined dimensions, which can include combinations of other dimensions, e.g., bandwidth X latency, derived cost metrics, or other measures/dimensions, may be integrated with the embodiments.

Figure 2:
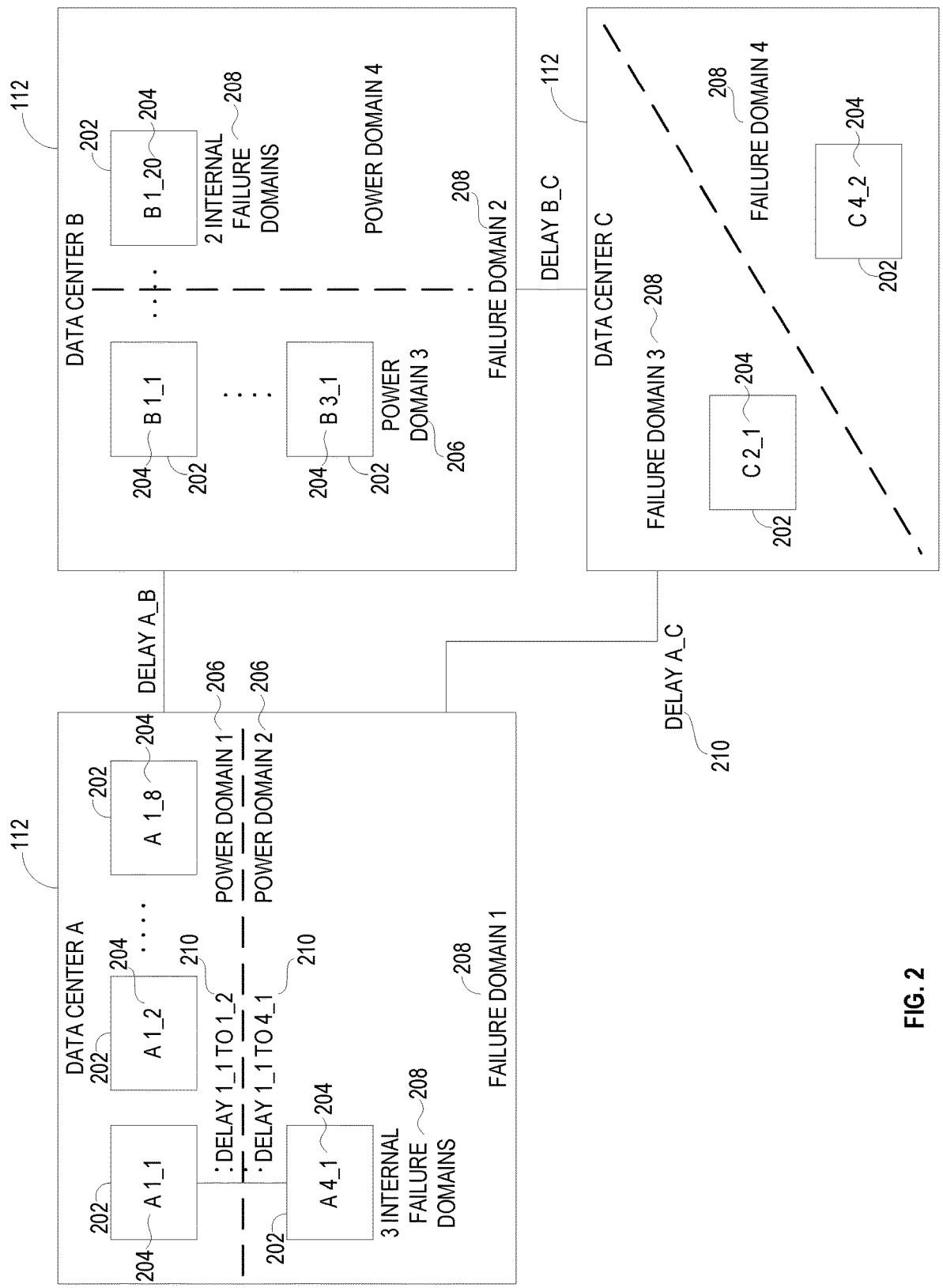
FIG. 2 is an example of a two-dimensional mapping of storage system resources, produced by the mapping system of FIG. 1 in accordance with some embodiments.

FIG. 2 is an example of a two-dimensional mapping of storage system resources 202, produced by the mapping system 102 of FIG. 1. In this depiction, the mapping is viewed on the display 104 attached to the mapping system 102, or could be viewed on a display 104 attached to another computing system or device. Each of the storage system resources 202 is represented as having an approximate or stylized physical location in a data center 112, as a physical mapping of the storage system resources 202 in some embodiments. As noted above, each of the storage system resources 202 may be represented as having an approximate virtual location, proximity, etc., in a data center 112, for a virtual mapping in some embodiments. Each storage system resource 202, which could be a storage device 114, a server 116 or host, a network device 118 or other equipment used in a storage system, is depicted in the mapping with a marking, symbol or other graphical representation (such as a rectangle, a drawing or image of equipment) and identification information 210 (shown here inside the marking or symbol, but could be alongside, above or below). In some embodiments, the identification information is coded to indicate a physical location in the data center. For example, as shown here, the identification information 204 codes the name of the data center and X and Y coordinates in a format of: data center name X_Y. The storage system resource 202 in the top left corner has identification information 204 "A 1_1", indicating equipment in data center "A" at X coordinate "1" and Y coordinate "1", and so on. This is a two-dimensional code, but three-dimensional codes, four and more dimensional codes, and other codes are readily developed. For example, a three-dimensional code could indicate on what floor of a building (e.g., a Z coordinate), as well as X and Y coordinates, a piece of equipment is located. Alternatively, a code could indicate on what rack of a shelf a piece of equipment is located, as well as where in the data center the shelf is located. A four dimensional code could indicate data center name, X and Y coordinates, shelf number in a rack, and floor of the building. Additional dimensions in the code could indicate a blade number, a node number, etc. A position ID (identifier) could show, e.g., rack 5 location 17. This or another naming convention is applied when equipment is named and installed, and could be associated with a network address for each piece of equipment, for example. By analyzing or parsing the names that have a coded naming convention, the mapping system 102 can determine the location of a storage system resource based on coding in the identification information.

The two-dimensional mapping shown in FIG. 2 is annotated with performance information of various types. For example, delay information 210 notes a delay from one storage system resource 202 to another storage system resource 202. Power domain information 202 indicates power domains, which can be relative to a data center 112 or relative to one or more storage system resources 202 or their internal systems. Failure domain information 208 shows various failure domains, which can be relative to a data center 112 or internal to one or more storage system resources 202. Gathering information for these is discussed further below. While the two-dimensional mapping is shown as flat, a three-dimensional mapping could be generated in a perspective view, isometric view, or other rendering. In further embodiments, the mapping may be one dimensional where everything is on a distance line from a center point, e.g., from a storage system or some other center point. In addition, time could be a dimension, especially where one of the other dimensions change over time, such as latency.

It is useful for decision-makers to understand proximity (both physical and in terms of performance-related communication delays or other parameters (e.g., power domains, user-defined metrics, etc.)) of various storage system resources 202, such as storage devices and servers, servers and servers, storage devices and storage devices, storage devices and network devices, servers and network devices, network devices and other network devices, etc. This understanding and relevant information could impact placement when planning for the future. With embodiments of the physical mapping showing physical proximity and relationships among the pieces of equipment, and communication delays between pieces of equipment, decision-makers are better supplied with information they can use. It should be appreciated that geographic proximity could refer to two or more adjacent buildings, where the systems are separated by more hops than what is inside each building, but are at a greater physical distance apart.

In some embodiments, the mapping system 102 can run what-if scenarios of grouping hosts and adding storage to existing or new hosts. The mapping system 102 could identify a resource to be added, and display a location for placing the resource, in the physical mapping. For example, the mapping system 102 could have a graphical user interface in which a user can click and select equipment to group, or drop and drag proposed new equipment into place in the physical mapping, and try out rearrangements of failure domains or power domains. These could be displayed or saved as proposed new arrangements.

Figure 3:
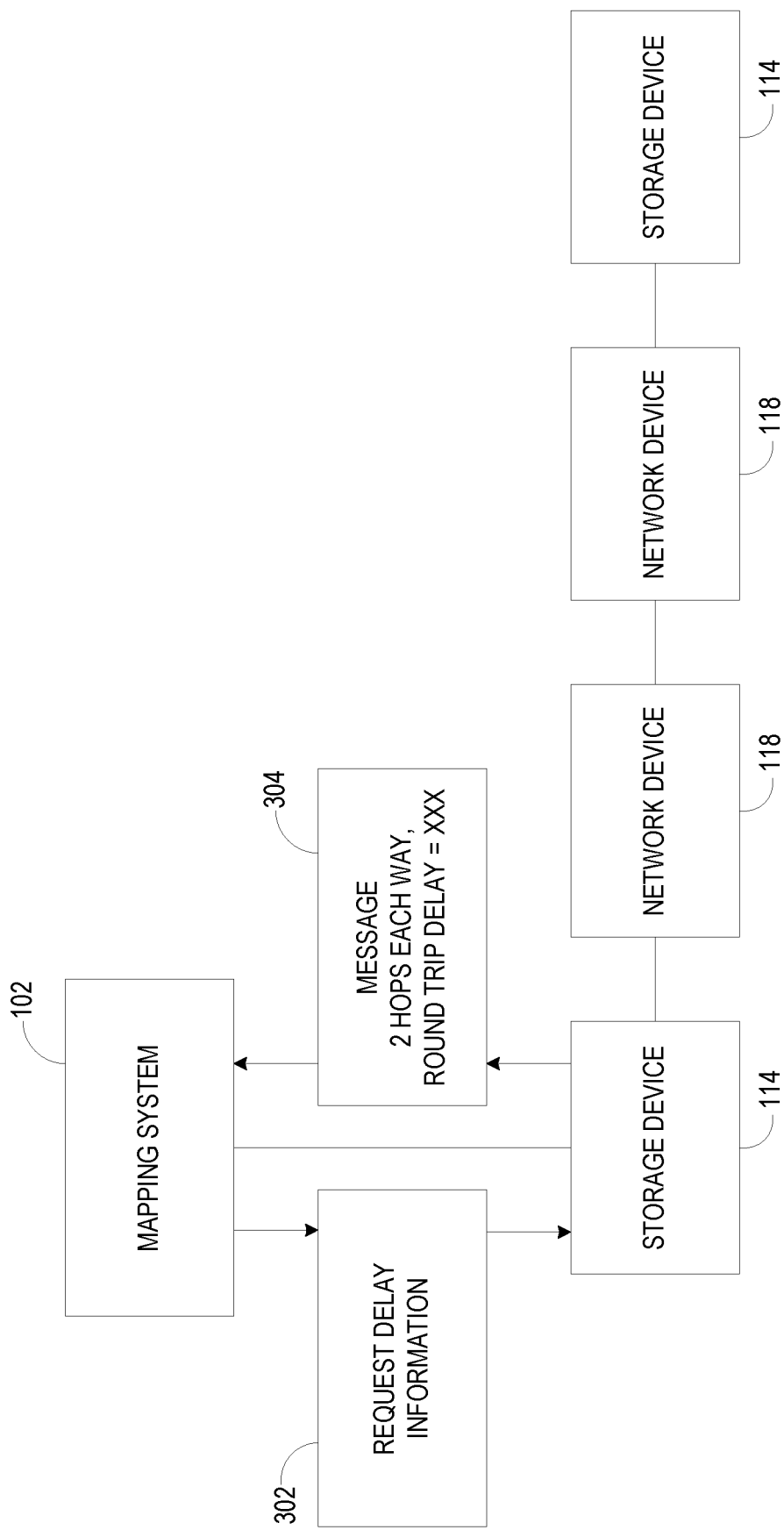
FIG. 3 depicts a storage device gathering latency information and communicating with the mapping system in accordance with some embodiments.

FIG. 3 depicts a storage device 114 gathering latency information and communicating with the mapping system 102. This is one type of performance information that can be represented in the physical mapping shown in FIG. 2, e.g., in the annotated delay information 210. To gather the latency information (or other delay information in further embodiments), the mapping system 102 sends a request, for example a delay information request 302, which could be a message or query, etc., to the storage device 114 (or other storage system resource 202) via the network 120 (not shown in FIG. 3, but see FIG. 1). The storage device 114 communicates through network device(s) 118 to another storage device 114, and measures the delay. For example, the storage device 114 could determine (e.g., using ping) it takes two network hops each way, for a total round-trip delay time, to communicate with the other storage device 114. Other examples of communications and determinations of delay times are readily devised, for various storage system resources as discussed in FIG. 1. In turn, the storage device 114 reports back to the mapping system 102, by sending for example a delay information message 304 or reply to the mapping system 102.

Mechanisms for gathering delay information could include communicating with cables or device ports that are programmed to respond with information about a length and type of a cable (e.g., fiber optic, copper), lookup tables for specifications of delays, loopback configurations, self-characterization of equipment, etc. Switches in some embodiments can inform about speed, serial numbers of cables, etc. Data fetch delays or other response times could be measured by the system. Data centers with large physical distance separation will likely show larger delays between data centers than inside data centers, and this can be represented in the physical mapping. The system could determine speed through switches, times or cables, transit time through switches, physical wire links to determine time of travel, etc. Also, network congestion, load times, etc., could be determined and represented in the annotations on a physical or virtual mapping.

Figure 4:
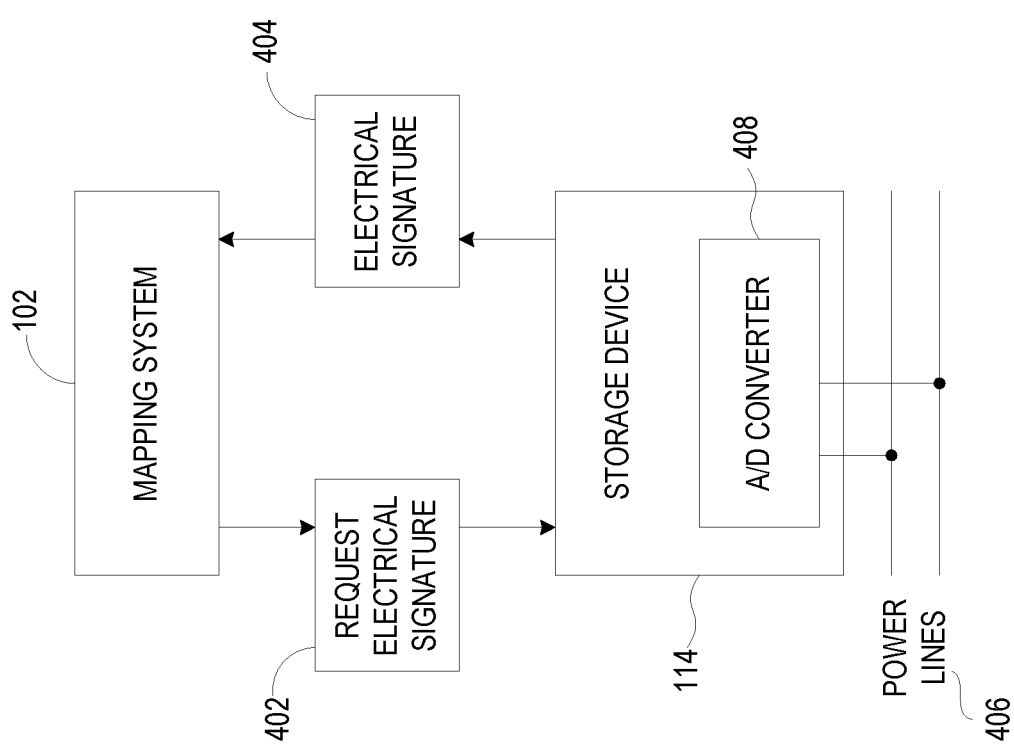
FIG. 4 depicts a storage device taking an electrical signature and communicating with the mapping system in accordance with some embodiments.

FIG. 4 depicts a storage device 114 taking an electrical signature and communicating with the mapping system 102. This is one type of information from which the mapping system 102 can derive power domains and represent these in the physical mapping shown in FIG. 2. To gather electrical signatures (or other power domain information in further embodiments), the mapping system 102 sends a request, for example an electrical signature request 402 to the storage device 114 (or other storage system resource 202) via the network 120. The storage device 114 activates an analog to digital converter 408 and samples voltage of one or more powerlines 406 over a span of time, and sends the resultant electrical signature 404 back to the mapping system 102. The mapping system 102 gathers electrical signatures 404 from various storage system resources 202, analyzes these, groups related ones together, and derives power domains from this information. The system could also detect differences in power phases and infer power domains.

In some embodiments, the mapping system 102 could recognize high frequency noise on a power line, and define a signature. Powerlines could be sampled multiple times over multiple days and compared to everything else in a system. This could be done on a rack by rack basis. For example, systems could use two sources of power (e.g., power supply redundancy), or pick up two of three phases in three-phase power. These signatures can be requested and read by the mapping system 102 as part of the power domain analysis. Knowledge of power domains can also be applied to separating out failure domains based on power distribution. It should be appreciated that in some embodiments power line communication may be utilized to identify or communicate how components or devices are connected from a power perspective. Each device in the connection communicates what that device is connected to and each device has a unique ID, thereby enabling the creation of a power domain map.

Figure 5:
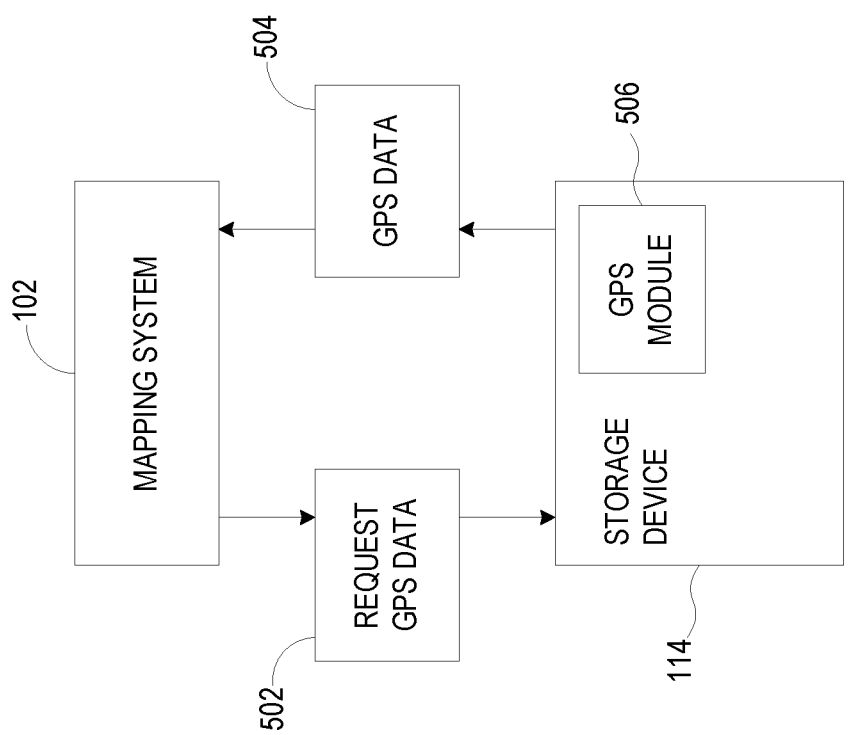
FIG. 5 depicts a storage device communicating GPS (global positioning system) information to the mapping system in accordance with some embodiments.

FIG. 5 depicts a storage device 114 communicating GPS (global positioning system) information to the mapping system 102. This is one type of information from which the mapping system 102 can derive physical locations of the various pieces of equipment and represent these in the physical mapping shown in FIG. 2. To gather GPS information (or other physical location information in further embodiments), the mapping system 102 sends a request, for example a GPS data request 502, to the storage device 114 (or other storage system resource 202) via the network 120. In some embodiments, storage devices 114 or other storage system resources 202 are equipped with GPS modules 506, and can respond to a GPS data request 502 by sending back GPS data 504 to the mapping system 102. The mapping system 102 gathers GPS data 504 from various storage system resources 202, and derives physical locations for these pieces of equipment to represent on the physical mapping.

In further embodiments, the system could use triangulation. With three defined points or beacons in a data center, a position could be triangulated and calculated. Or, phase shift could be accounted for in a single transmission. A resistive chain could be used to sense distance in a rack mount. Physical distances can be calculated based on cable lengths, for example obtained from Electrically Erasable Programmable Read-Only Memories (EEPROMs) in cables. Link layer discovery protocols can be used to see what is connected to what via neighbor discovery, and from this delay times can be calculated and used to approximate distances based on fiber-optic transit times. Further mechanisms for the mapping system 102 to request and gather physical location information, for analysis and inclusion in the physical mapping, could be devised in keeping with the teachings herein.

Figure 6:
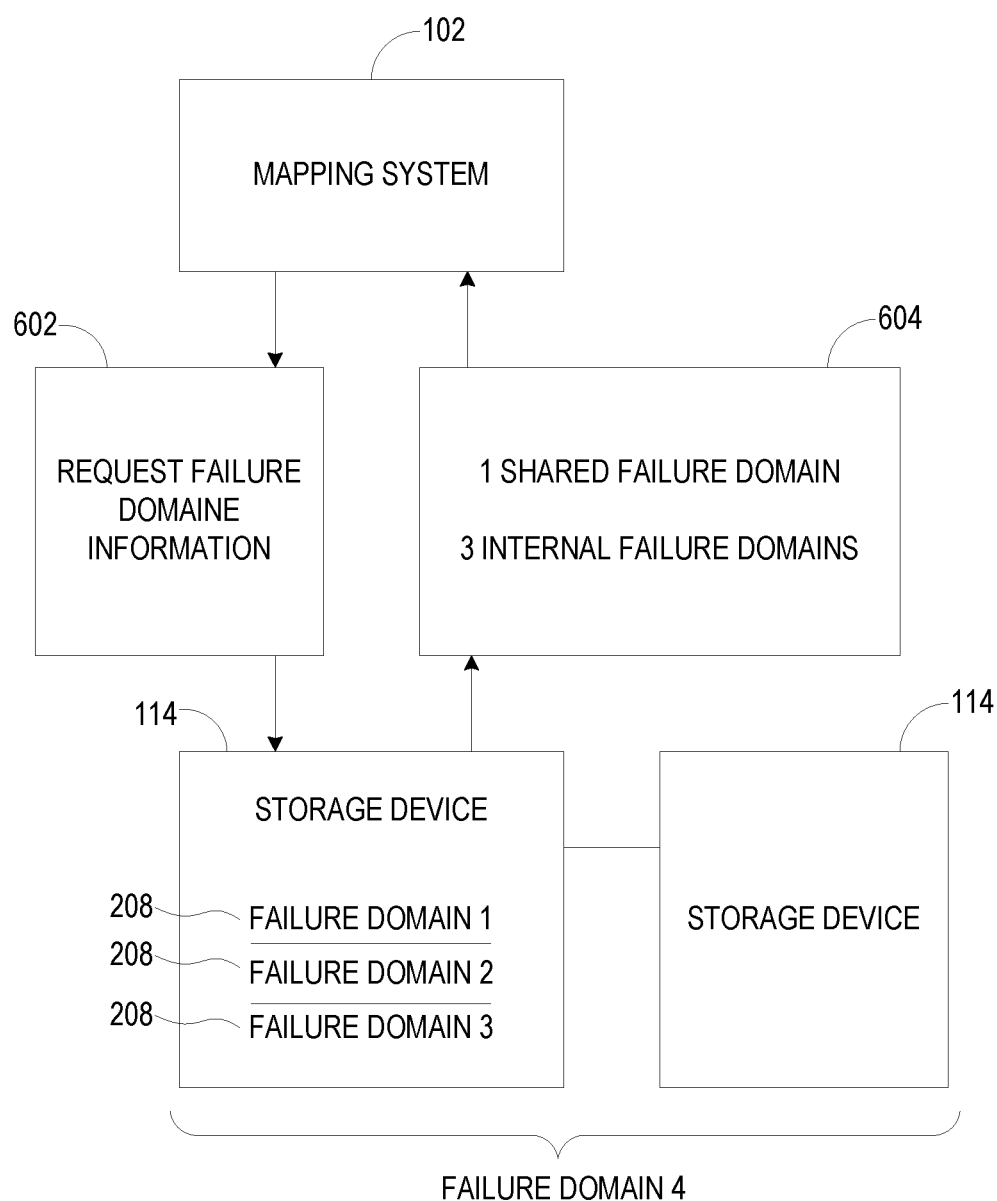
FIG. 6 depicts a storage device communicating failure domain information to the mapping system in accordance with some embodiments.

FIG. 6 depicts a storage device 114 communicating failure domain information to the mapping system 102. From this information, the mapping system 102 derives failure domains and represents these in the physical mapping shown in FIG. 2. To gather failure domain information, the mapping system 102 sends a request, for example a failure domain information request 602 to the storage device 114 (or other storage system resource 202) via the network 120. The storage device 114 reports back, and sends failure domain information 604 to the mapping system. For example, the storage device 114 could report three internal failure domains 208 and a shared failure domain across itself and another storage device 114. Failure domains are further discussed below.

One embodiment of a failure domain is a group of components dependent on a particular component, for example a group of blades connected to the same power source, a group of blades that data is striped across, or a group of equipment connected to the same power lines. Failure domains can be formed based on policies, for example:

the maximum number of blades in each chassis that may be included in the failure domain
  the maximum number of blades in a particular failure domain that may fail without data loss
  the maximum number of chassis in a particular failure domain that may fail without data loss
  the maximum number of network hops that are permissible between two or more blades in a particular failure domain
  the minimum amount of network bandwidth that must be available between two or more blades in a particular failure domain
  the minimum amount of storage capacity for one or more blades in a particular failure domain
  the maximum age for one or more blades in a particular storage domain An example of a failure domain formation policy is one that contains rules indicating that the failure domain should include three blades that data will be striped across, and that the failure domain should utilize an n+1 data redundancy policy such that two of the blades will contain user data and the other blade will contain redundancy data (e.g., parity data that may be used to reconstruct user data in the event of a blade failure). Another example is a policy that contains one or more rules specifying that the failure domain should be able to tolerate the failure of an entire chassis without the loss of user data while the loss of two or more chassis can result in user data being lost. Other examples are readily devised.

Equipment that forms failure domains based on policies could report back on the policies and adherence to the policies when so requested or queried. A failure domain, in some examples, represents a group of components within a storage system that can be negatively impacted by failure of another component in the storage system. A failure domain could be embodied as a group of blades, storage nodes, storage clusters, servers, hosts, or network devices, etc., all connected to the same power source. Failure of the power source would negatively impact this group. A failure domain could be embodied as a group of blades or other pieces of equipment, carrying out data communications by connecting to one or more data communications networks via a data communications bus provided by a single chassis. The failure of the chassis or the data communications bus would negatively impact the group. A failure domain could be embodied as a group of devices that are logically dependent upon each other. For example, a group of blades that some piece of data is striped across could experience failure of a blade, and that could negatively impact that group of blades that are logically dependent upon each other.

Failure domain policies and/or data redundancy policies can be devised so that data redundancy accounts for the possibility of a failure in a failure domain and data is recoverable under specified circumstances. These policies could cover loss of various numbers of blades, various numbers of chassis, various communications networks, power sources, components, racks, or even loss of an entire data center. Failure domains can overlap. A failure domain could be specific to a type of data or a data owner, or to a type of equipment or specific piece or group of equipment, or a portion of a piece of equipment or grouped portions of pieces of equipment, physical constraints, logical constraints, types of memory, data, error correction, redundancy, data recovery, system architecture, applications, operating system(s), file system(s), network(s), one or more policies, users or tenants, etc. It should be appreciated that the definition of a failure domain is not limited to any particular example discussed herein, but is flexible and situation dependent.

Figure 7:
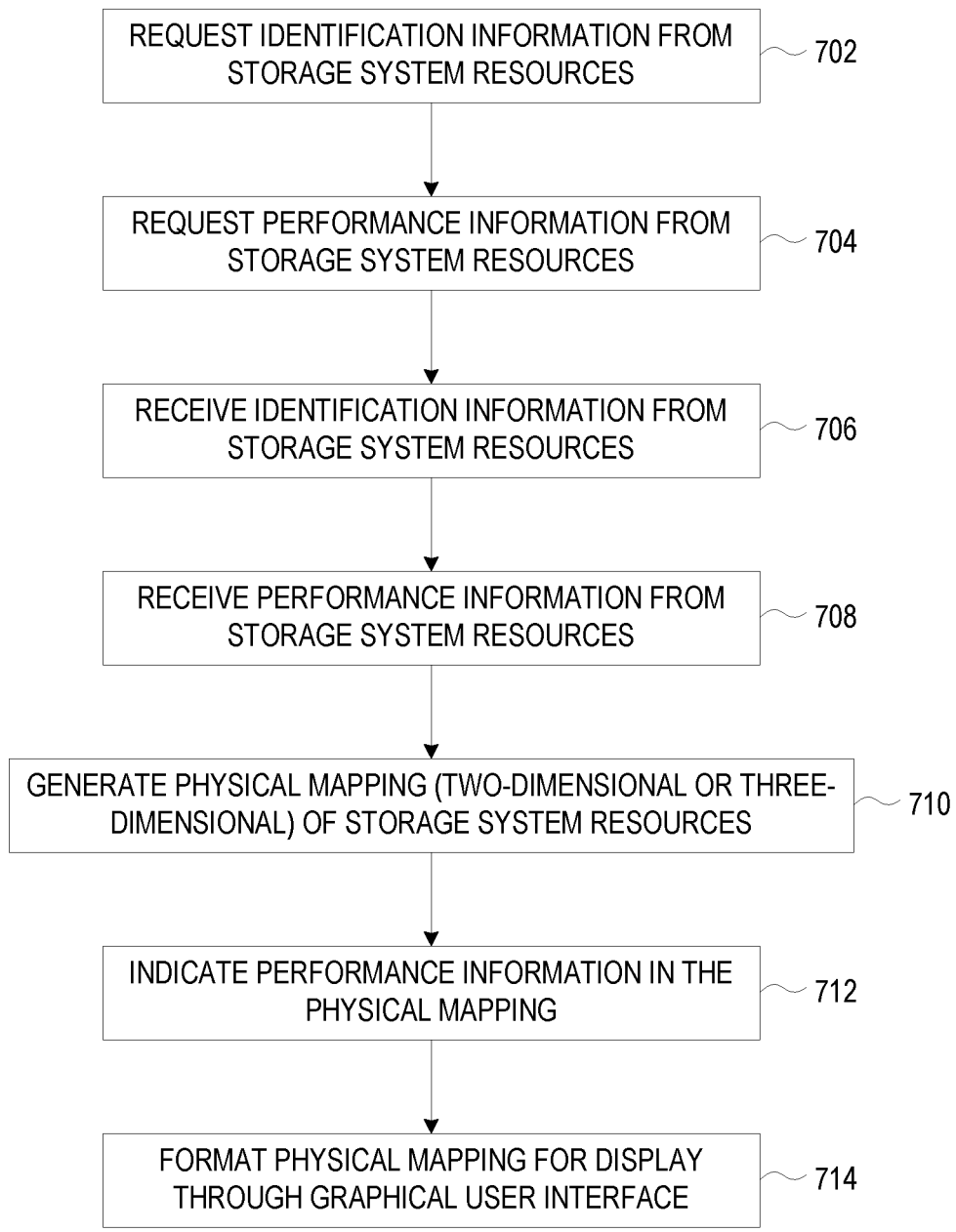
FIG. 7 is a flow diagram of a method of mapping storage system resources in accordance with some embodiments.

FIG. 7 is a flow diagram of a method of mapping storage system resources. The method can be performed by a processor-based mapping system, more specifically by one or more processors coupled to storage system resources as described herein. In an action 702, the mapping system requests identification information from storage system resources. In an action 704, the mapping system requests performance information from storage system resources. Storage system resources could include storage devices, servers or hosts, network devices, etc. Identification information could include names of various resources, and in some embodiments the names could encode physical or network location information. Performance information could include delay information such as network hops or delay times, equipment information, cable information, power domain information, electrical signatures, failure domain information, etc.

In an action 706, the mapping system receives identification information from storage system resources. The identification information may be acquired through a naming convention as described above in some embodiments. In an action 708, the mapping system receives performance information from storage system resources. Based on this information received in the actions 706, 708, the mapping system generates physical mapping of storage system resources, in an action 710. The physical mapping could be two-dimensional or three-dimensional as described above, in some embodiments. In an action 712, the mapping system indicates performance information in the physical mapping. This can be done by annotating the physical mapping, for example with notes relating to equipment or connections among pieces of equipment or data centers. The physical mapping thus denotes, designates or otherwise represents both identification information and performance information in the mapping of the locations of the storage system resources. In an action 714, the mapping system formats the physical mapping for display through a graphical user interface (or printing). In this manner, the mapping system presents a physical mapping of storage system resources, with performance information annotated in the physical mapping, through the graphical user interface to a display, for use by decision-makers when expanding a storage system. In variations, other formats are used, for example for a database.

Figure 8:
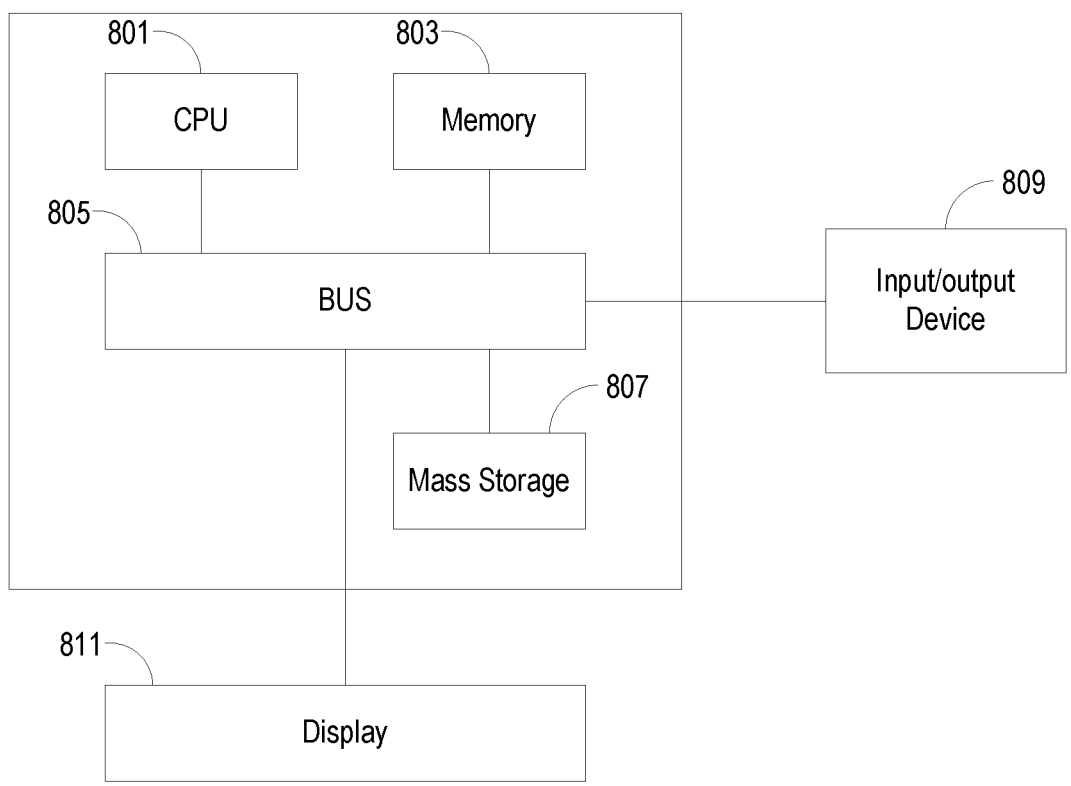
FIG. 8 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for mapping a storage system in accordance with some embodiments. The computing device includes a central processing unit (CPU) 801, which is coupled through a bus 805 to a memory 803, and mass storage device 807. Mass storage device 807 represents a persistent data storage device such as a disc drive, which may be local or remote in some embodiments. The mass storage device 807 could implement a backup storage, in some embodiments. Memory 803 may include read only memory, random access memory, etc. Applications resident on the computing device may be stored on or accessed via a computer readable medium such as memory 803 or mass storage device 807 in some embodiments. Applications may also be in the form of modulated electronic signals modulated accessed via a network modem or other network interface of the computing device. It should be appreciated that CPU 801 may be embodied in a general-purpose processor, a special purpose processor, or a specially programmed logic device in some embodiments.

Display 811 is in communication with CPU 801, memory 803, and mass storage device 807, through bus 805. Display 811 is configured to display any visualization tools or reports associated with the system described herein. Input/output device 809 is coupled to bus 805 in order to communicate information in command selections to CPU 801. It should be appreciated that data to and from external devices may be communicated through the input/output device 809. CPU 801 can be defined to execute the functionality described herein to enable the functionality described with reference to FIGS. 1-7. The code embodying this functionality may be stored within memory 803 or mass storage device 807 for execution by a processor such as CPU 801 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
    receiving identification information from a plurality of storage system resources of at least one data center;
    receiving performance information from the plurality of storage system resources;
    generating a physical mapping, in one or more dimensions, of physical locations of each of the plurality of storage system resources, indicating geographic proximity of the plurality of storage resources relative to each other and the at least one data center; and
    representing the identification information and the performance information in the physical mapping of each of the plurality of storage system resources.

2. The method of claim 1, further comprising:
    displaying the physical mapping, through a graphical user interface;
        identifying a resource to be added to the storage system resources; and
        displaying in the physical mapping a location for placing the resource to be added.

3. The method of claim 1, further comprising:
    determining a location of one of the plurality of storage system resources based on a correspondence between the location and the identification information as communicated by the plurality of storage system resources.

4. The method of claim 1, further comprising:
    requesting that a storage device, as one of the plurality of storage system resources, reply with latency information regarding a delay from the storage device to another storage device, wherein the representing includes providing the latency information in the physical mapping.

5. The method of claim 1, further comprising:
    determining electrical power domains in the at least one data center, based on information regarding electrical signatures as determined by the plurality of storage system resources; and
    representing the electrical power domains in the physical mapping.

6. The method of claim 1, further comprising:
    receiving GPS (global positioning system) information regarding one of the plurality of storage system resources, wherein the generating the physical mapping is based on the GPS information.

7. The method of claim 1, further comprising:
    determining failure domains of the plurality of storage system resources; and
    representing the failure domains in the physical mapping.

8. A tangible, non-transitory, computer-readable media having instructions thereupon which, when executed by a processor, cause the processor to perform a method comprising:
    requesting identification information from a plurality of storage system resources of one or more data centers;
    requesting performance information from the plurality of storage system resources;
    generating a physical mapping of physical locations of each of the plurality of storage system resources, indicating geographic proximity of the plurality of storage resources relative to each other and the one or more data centers, based on replies from the plurality of storage system resources; and
    designating the identification information and the performance information in the physical mapping of each of the plurality of storage system resources.

9. The computer-readable media of claim 8, wherein the method further comprises:
    formatting the physical mapping for display through a graphical user interface;
        identifying a resource to be added to one of the storage system resources; and
        displaying in the physical mapping a location for placing the resource to be added.

10. The computer-readable media of claim 8, wherein the method further comprises:
    determining a location of one of the plurality of storage system resources based on a coding in the identification information.

11. The computer-readable media of claim 8, wherein the method further comprises:
    requesting, to a first storage device in the plurality of storage system resources, latency information regarding a delay from the first storage device to a second storage device; and
    including the latency information in the performance information as designated in the physical mapping.

12. The computer-readable media of claim 8, wherein the method further comprises:
  requesting at least a subset of the plurality of storage system resources reply with information regarding electrical signatures;
  determining electrical power domains in the at least one data center, based on the information regarding electrical signatures; and
  designating the electrical power domains in the physical mapping.

13. The computer-readable media of claim 8, wherein the method further comprises:
  requesting, to at least a subset of the plurality of storage system resources, GPS (global positioning system) information regarding physical location of each of the at least a subset of the plurality of storage system resources, wherein the generating the physical mapping is based on the GPS information.

14. The computer-readable media of claim 8, wherein the method further comprises:
  requesting, to the plurality of storage system resources, information regarding failure domains in the at least one data center; and
  designating the failure domains in the physical mapping.

15. A mapping system, comprising:
  a network module; and
  at least one processor configurable to:
  request and receive identification information via the network module, from the plurality of storage system resources;
  request and receive performance information via the network module, from the plurality of storage system resources;
  derive a physical mapping, of physical locations of each of the plurality of storage system resources in the at least one data center, indicating geographic proximity of the plurality of storage resources relative to each other and the at least one data center, based on the received identification information; and
  indicate the performance information in the physical mapping.

16. The mapping system of claim 15, wherein the identification information is coded and associated with physical location information.

17. The mapping system of claim 15, further comprising:
  the at least one processor configurable to request and receive latency information via the network module, from the plurality of storage system resources regarding delays in network hops and cabling; and
  the at least one processor configurable to indicate the latency information in the physical mapping.

18. The mapping system of claim 15, further comprising:
  the at least one processor configurable to request and receive information regarding electrical signatures via the network module, from and as determined by the plurality of storage system resources; and
  the at least one processor configurable to determine and indicate electrical power domains in the physical mapping, based on the information regarding electrical signatures.

19. The mapping system of claim 15, further comprising:
  the at least one processor configurable to request and receive GPS (global positioning system) information via the network module, from and as determined by the plurality of storage system resources; and
  the at least one processor configurable to determine the physical locations, relative to the at least one data center, for the physical mapping based on the GPS information.

20. The mapping system of claim 15, further comprising:
  the at least one processor configurable to request and receive information regarding failure domains in the storage system resources of the one or more data centers via the network module, from the plurality of storage system resources; and
  the at least one processor configurable to indicate the failure domains in the physical mapping, based on the information regarding failure domains.

\* \* \* \* \*